United States Patent
Lasa et al.

(10) Patent No.: US 8,050,417 B2
(45) Date of Patent: Nov. 1, 2011

(54) AUXILIARY ELECTROMAGNETIC VALVE FOR A GAS SERVO VALVE

(75) Inventors: José Maria Lasa, Oñati (ES); Mikel Arizmendi, Ordizia (ES); Marcos Pablo, Hernani (ES)

(73) Assignee: Orkli S. Coop, Ordizia (ES)

( * ) Notice: Subject to any disclaimer, the term of this patent is extended or adjusted under 35 U.S.C. 154(b) by 962 days.

(21) Appl. No.: 12/008,746

(22) Filed: Jan. 14, 2008

(65) Prior Publication Data

US 2008/0179556 A1    Jul. 31, 2008

(30) Foreign Application Priority Data

Jan. 31, 2007   (ES) .................................. 20070205 U

(51) Int. Cl.
    *H03G 3/00*    (2006.01)
(52) U.S. Cl. ................ 381/61; 251/129.15; 251/129.21
(58) Field of Classification Search ............. 251/129.15, 251/129.21, 58; 381/61
    See application file for complete search history.

(56) References Cited

U.S. PATENT DOCUMENTS

| | | | |
|---|---|---|---|
| 3,971,542 A * | 7/1976 | Lee, II ............................ 251/58 |
| 4,009,861 A | 3/1977 | Hirst |
| 4,170,339 A * | 10/1979 | Ueda et al. ................. 251/129.2 |
| 4,347,201 A * | 8/1982 | Sagawa et al. ................. 264/428 |
| 4,697,608 A * | 10/1987 | Kolze et al. ......................... 137/1 |
| 4,875,658 A * | 10/1989 | Asai ......................... 251/129.21 |
| 4,967,996 A * | 11/1990 | Sonoda et al. ............. 251/30.02 |
| 4,984,549 A * | 1/1991 | Mesenich ...................... 123/472 |
| 5,608,176 A * | 3/1997 | Patterson ......................... 84/337 |
| 6,225,886 B1 * | 5/2001 | Kleinert et al. ................ 335/257 |
| 6,390,443 B1 * | 5/2002 | Katayama et al. ....... 251/129.15 |
| 6,486,761 B1 * | 11/2002 | Czarnetzki et al. ........... 335/220 |
| 6,786,236 B2 * | 9/2004 | Jansen ...................... 137/625.64 |
| 7,472,883 B2 * | 1/2009 | Murao et al. ............. 251/129.15 |
| 7,588,002 B2 * | 9/2009 | Wygnanski et al. ....... 123/90.11 |
| 7,806,683 B2 * | 10/2010 | Mitxelena et al. .............. 431/80 |
| 2002/0168297 A1 * | 11/2002 | Shvets et al. ................... 422/100 |
| 2003/0178073 A1 * | 9/2003 | Jansen ...................... 137/625.64 |
| 2005/0072950 A1 * | 4/2005 | Tojo et al. ................ 251/129.15 |
| 2007/0158605 A1 * | 7/2007 | Murao et al. ............. 251/129.15 |
| 2008/0035870 A1 * | 2/2008 | Wygnanski et al. ..... 251/129.15 |
| 2008/0070170 A1 * | 3/2008 | Mitxelena et al. .............. 431/78 |
| 2008/0179556 A1 * | 7/2008 | Lasa et al. ................ 251/129.21 |
| 2009/0039302 A1 * | 2/2009 | Giacomini et al. ...... 251/129.15 |
| 2009/0078901 A1 * | 3/2009 | Guirado Tristan et al. ............ 251/129.21 |
| 2010/0219361 A1 * | 9/2010 | Echenagusia Saez de Zaitegui et al. ..... 251/129.15 |

FOREIGN PATENT DOCUMENTS

| | | | |
|---|---|---|---|
| EP | 1801501 A2 * | 6/2007 |
| EP | 2040271 A1 * | 3/2009 |
| EP | 2182584 A1 * | 5/2010 |
| ES | 1062120 U | 6/2006 |
| JP | 54050740 A * | 4/1979 |
| JP | 2009074694 A * | 4/2009 |

* cited by examiner

*Primary Examiner* — Laura M Menz
(74) *Attorney, Agent, or Firm* — Tim L. Kitchen; Peter B. Scull; Berenbaum Weinshienk PC

(57) ABSTRACT

Auxiliary electromagnetic valve for its incorporation into a main valve of a gas servo valve, which comprises a body with an auxiliary outlet conduit connected to an outlet conduit of the servo valve, a pivoting arm that comprises a closure member of a valve seat of the auxiliary outlet conduit, a ferromagnetic armature that closes the magnetic circuit opening the valve seat, and a return means, supported by a plate, that returns the pivoting arm in order to keep the seating closed. The body is configured by means of a peripheral surface fitted to a cavity of the main valve, a lower surface supported against the cavity by means of fitting means, an intermediate transverse surface on which the valve seat is fitted, a transverse perimetral rim upon which the plate is fixed, and an auxiliary hole that connects the valve seat to the outlet conduit.

12 Claims, 4 Drawing Sheets

AUXILIARY ELECTROMAGNETIC VALVE FOR A GAS SERVO VALVE

TECHNICAL FIELD

The present invention relates to an auxiliary electromagnetic valve for a small gas flow, of the pivoting arm type, which controls a diaphragm type gas switching servo valve for controlling combustion mainly in heating appliances, tank water heaters and gas ovens.

PRIOR ART

U.S. Pat. No. 4,009,861 describes a servo valve fitted with an auxiliary control valve housed inside the metal casing of the regulation valve. Said housing cavity forms a control chamber in which the auxiliary valve is fitted, in connection to the inlet chamber in which gas enters from the source. The auxiliary valve comprises an electromagnet and a pivoting armature, which is provided with a valve closure member pushed by a return spring to its rest position. The auxiliary valve is fixed inside said cavity so that the closure member is positioned over a valve seat belonging to a dividing wall between the control chamber and the pressure chamber operating the servo valve.

In the example cited from the prior art, the cavity housing the auxiliary valve inside the casing is square and broad as the configuration of the auxiliary valve is not particularly suited for its fitting in the cavity. Due to the fact that the valve seat belongs to said dividing wall of the housing cavity, following the assembling and the fixing of the electromagnet and the other pieces of the auxiliary valve in the cavity, a time-consuming operation must be carried out in order to adjust the pivoting arm and its opening and closing strokes. The connection of the supply cables to the electromagnet terminals is also time-consuming.

ES 1062120 U discloses a diaphragm type switching servo valve that comprises a diaphragm type main valve that defines on each side an inlet chamber and a control chamber with a differential pressure between them and which moves a main gas-flow closure member, and a pivoting arm type auxiliary valve fitted on the main valve, which comprises an electromagnet provided with a U-shaped core, wherein said pivoting arm includes a ferromagnetic armature which closes the magnetic circuit of the electromagnet when it is switched on to open a valve seat for draining the control chamber of the main valve. This document discloses an auxiliary valve that comprises a metal casing that is fixed externally above the body of the main valve, thereby increasing the final volume of the servo valve, and wherein the valve seat is built into the casing itself, as a result of which the auxiliary valve is adjusted prior to being assembled. The electromagnet of the auxiliary valve and its electrical supply terminals are housed inside the casing.

DISCLOSURE OF THE INVENTION

It is the object of the present invention to provide a pivoting arm type auxiliary electromagnetic valve that governs a diaphragm type gas-flow-switching servo valve, the dimensions of which are adapted so it may be housed in the body of said switching servo valve for domestic heating.

The auxiliary electromagnetic valve is provided with means for its incorporation into a main valve of a servo valve and comprises a body that includes a auxiliary gas outlet conduit with a valve seat, said auxiliary outlet conduit being connected to the outlet conduit of the servo valve, a pivoting arm housed in the body and which includes a secondary closure member for said valve seat, an electromagnet housed in the body, said electromagnet being provided with a U-shaped core with two branches, a ferromagnetic armature inserted in the pivoting arm which closes the magnetic circuit of the electromagnet when it is switched on thereby moving said pivoting arm and opening the valve seat, and a return means for returning the pivoting arm to a rest position in which the valve seat remains closed.

The auxiliary electromagnetic valve is built in such a way that it can be integrated into a cavity of the main valve, which is connected to a control chamber of said main valve, with the result that the body of the auxiliary valve is configured by means of a peripheral surface fitted to said cavity, a substantially flat lower surface supported against the base of the cavity by assembling means, an intermediate transverse surface on which the valve seat is fitted, a perimetral transverse rim upon which the support plate is fixed, and an auxiliary hole that connects the valve seat to the gas outlet conduit. In this way the dimensions of the auxiliary electromagnetic valve of the prior art are reduced, thereby reducing the final volume of the servo valve.

These and other advantages and characteristics of the invention will be made evident in the light of the drawings and the detailed description thereof.

DETAILED DISCLOSURE OF THE INVENTION OF A PREFERRED EMBODIMENT

Figure 7:
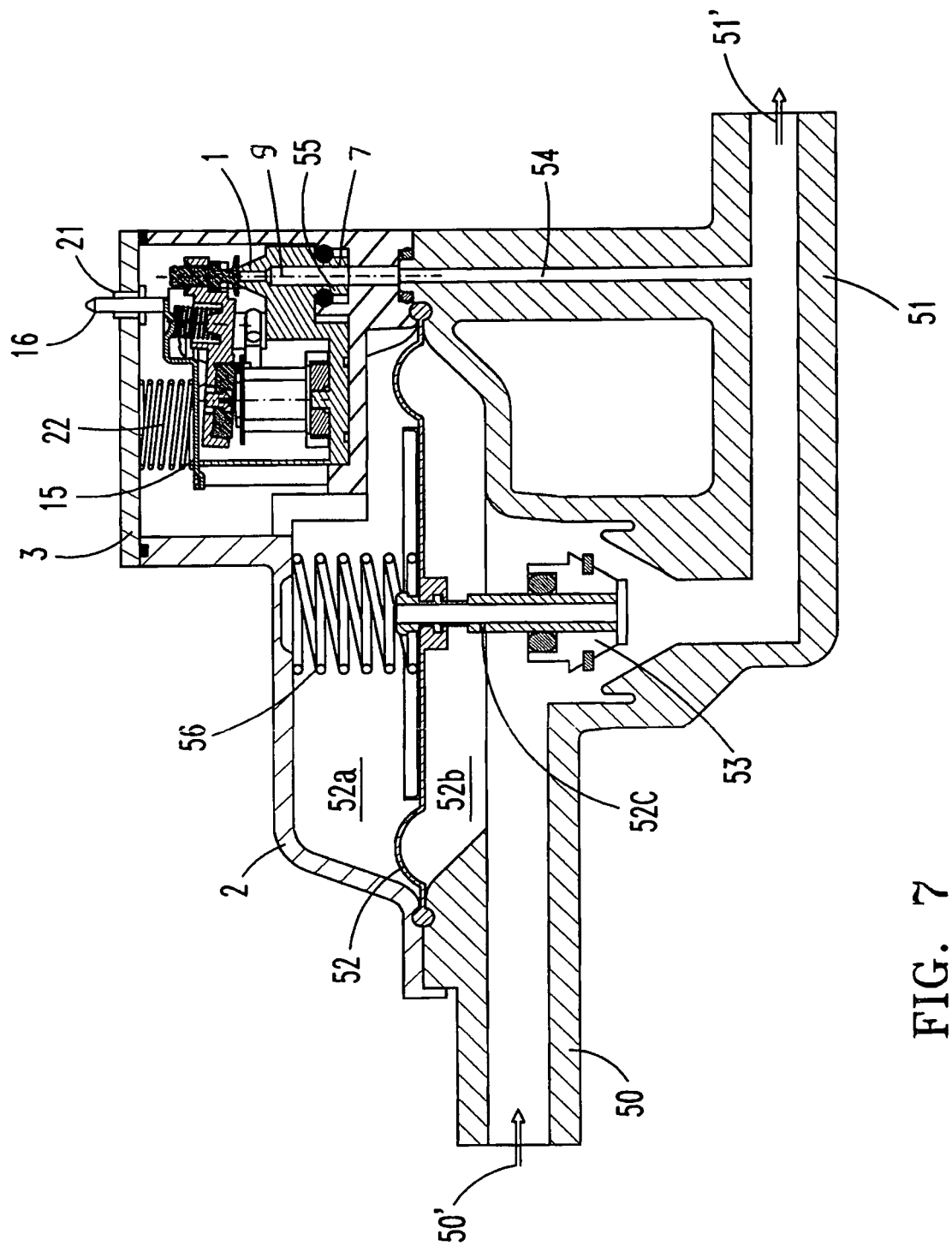
FIG. 7 is a cross-sectional view of the servo valve formed by the auxiliary electromagnetic valve of FIG. 1 inserted in the main valve.

FIG. 7 shows a gas-switching servo valve provided with a main valve 2 and an auxiliary electromagnetic valve 1 adapted to the main valve 2, wherein said main valve 2 includes a gas inlet conduit 50 and a gas outlet conduit 51, and is operated by a diaphragm 52 that moves a main closure member 53.

The diaphragm 52 defines on each of its sides a gas inlet chamber 52b and a control chamber 52a connected together by a hole 52c in said diaphragm 52 or by an external conduit, not shown in the figures, that connects both chambers 52a, 52b, so that when a flow 50' is supplied to the inlet chamber 52b, said flow 50' passes through the hole 52c to the control chamber 52a, thereby keeping the pressure equal in both chambers 52a, 52b and enabling the main closure member 53 to keep the passage of gas to the gas outlet conduit 51 closed as a result of a spring 56 pushing on the diaphragm 52.

With reference to FIGS. 1-6, an auxiliary electromagnetic valve 1 comprises a valve body 6 with an auxiliary gas outlet conduit 7, an electromagnet 11 with a U-shaped core 23 and a winding 24, a pivoting arm 10 that comprises a ferromagnetic armature 27 in the form of a disc that opens and closes the magnetic circuit of the electromagnet 11 and an auxiliary closure member 14 inserted in a straight extremity 10a of the pivoting arm 10, a valve seat 19 connected to the auxiliary gas outlet conduit 7, a return means 12, for example a spring, and a support plate 13 screwed to the body 6 supporting the spring 12.

When the auxiliary electromagnetic valve 1 is switched on the pivoting arm 10 pivots, thereby separating the auxiliary closure member 14 from the valve seat 19 and opening the passage of gas in order to drain the control chamber 52a of the main valve 2, as a result of which the pressure exerted by the inlet gas 50' on the diaphragm 52 overcomes the force of the spring 56 and raises the main closure member 53, thereby establishing the supply of the outlet gas flow 51' of the main valve 2.

When the electromagnet 11 is switched off, the spring 12 forces the pivoting arm 10 to return to its rest position, thereby closing the passage of gas through the valve seat 19, with the result that the pressure on both sides of the diaphragm 52 is equalised and the main closure member 53 closes the passage of gas towards the outlet conduit 51 as a result of the spring 56 pushing on the diaphragm 52.

With reference to FIGS. 1-6, the auxiliary electromagnetic valve 1 is substantially prismatic in shape with an elliptical cross-section, said elliptical cross-section being defined by a major axis A. The body 6, made of moulded plastic, includes a peripheral elliptical surface 6a that allows it to fit tightly into a cavity 5 with an elliptical cross-section in the body of the main valve 2. Said cavity 5 is directly connected to the control chamber 52a, with both the cavity and the control chamber being subjected to the same pressure, and has an open upper surface that is covered with a metal cap 3. In addition, the base of said cavity 5 has a projection 40 that is centred in relation to the major axis of the elliptical cross-section of said cavity 5, and which serves as a guide for positioning the auxiliary electromagnetic valve 1 in the main valve 2. The peripheral surface 6a includes a non-through axial positioning channel 31 with a substantially rectangular section and centred in relation to the major axis A. Said positioning channel 31 determines the fitting position of the auxiliary electromagnetic valve 1 in the cavity 5 of the main valve, which must house the projection 40 of the cavity 5 in its interior after assembling.

The body 6 with a substantially elliptical cross-section includes a housing 28 in which is situated the electromagnet 11, a flat lower surface 6b that is supported on the bottom of the cavity 5 of the main valve 2 by the force of a fitting spring 22 supported beneath the cap 3 of the servo valve, an intermediate transverse surface 6c on which the valve seat 19 of the auxiliary electromagnetic valve 1 is fitted, and an upper perimetral rim 6d upon which the support plate 13 is fixed. The valve seat 19 is centred in relation to the major axis A of the auxiliary electromagnetic valve 1, and is moulded integrally with the body 6, which allows the body 6 to be provided with the auxiliary internal through hole 9 which runs through from the valve seat 19.

The body 6 of the auxiliary valve 1 comprises, in the lower part, the outlet conduit 7 the end 7b of which is coplanar to the lower surface 6b and concentric to the auxiliary hole 9, and which is inserted during assembling in the cavity 5 of the main valve 2, specifically in the interior of a protuberance 55 adapted in order to house said auxiliary outlet conduit 7 in its interior. The auxiliary gas outlet conduit 7 is concentric to a purge conduit 54 in the main valve that is connected to the outlet conduit 51. An airtight seal 8 between the auxiliary outlet conduit 7 and the bottom of the cavity 5 of the main valve 2 ensures pressure insulation between the chambers 52a and the outlet conduit 51.

The electromagnet 11 comprises the U-shaped core 23 with two open branches 23a, 23b of a semi-circular section and the winding 24 formed by two parts in series superimposed around the two branches 23a, 23b of the "U". The winding 24 is wound on a circular insulating reel 25 made up of two halves with a semi-circular section, the flat faces of which are juxtaposed between the two branches 23a, 23b. The core 23 has a fixing hole 41 centred in the base of the "U", through which it is inserted into a fixing projection 42 built into the base of the housing 28.

Figure 1:
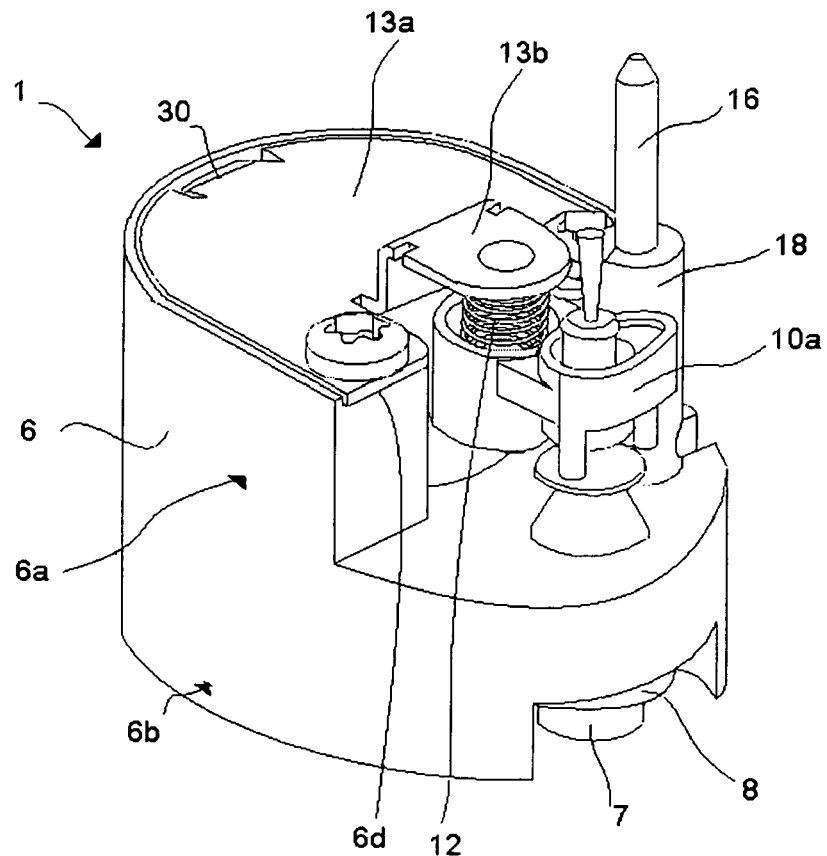
FIG. 1 is a perspective view of an auxiliary electromagnetic valve for a gas servo valve according to the invention.
Figure 2:
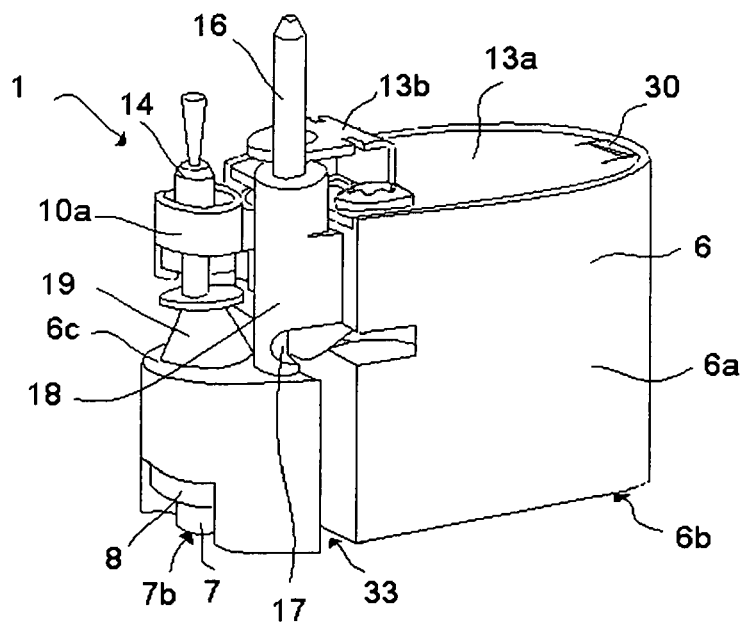
FIG. 2 is a second perspective view of the auxiliary electromagnetic valve of FIG. 1.
Figure 5:
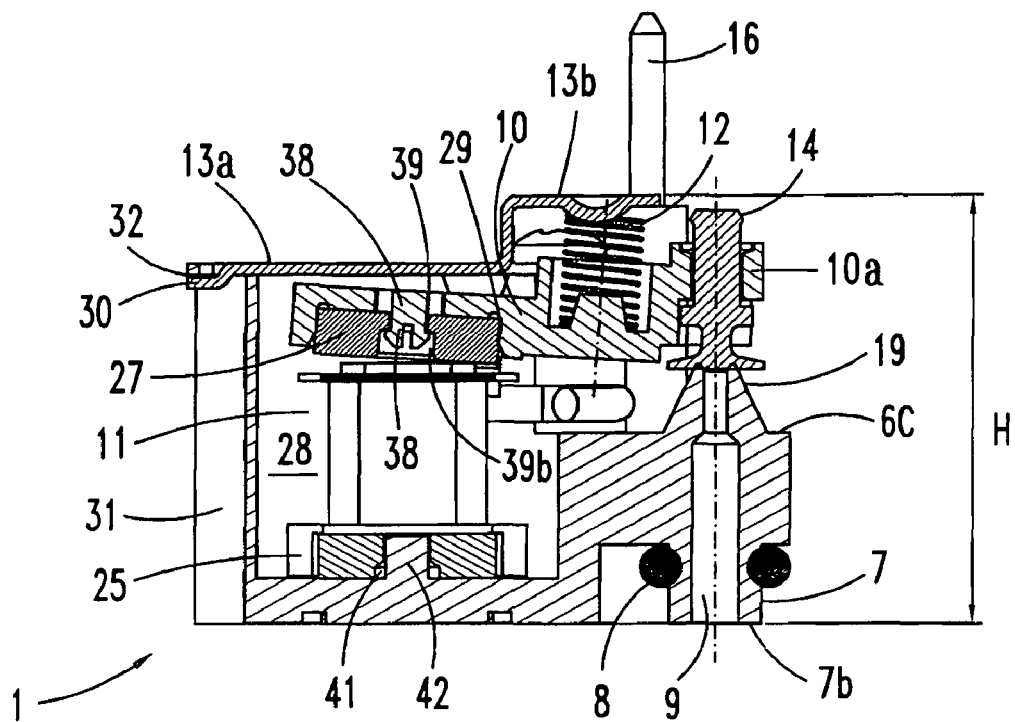
FIG. 5 is a view of the cross-section according to section V-V of the auxiliary electromagnetic valve of FIG. 3.
Figure 3:
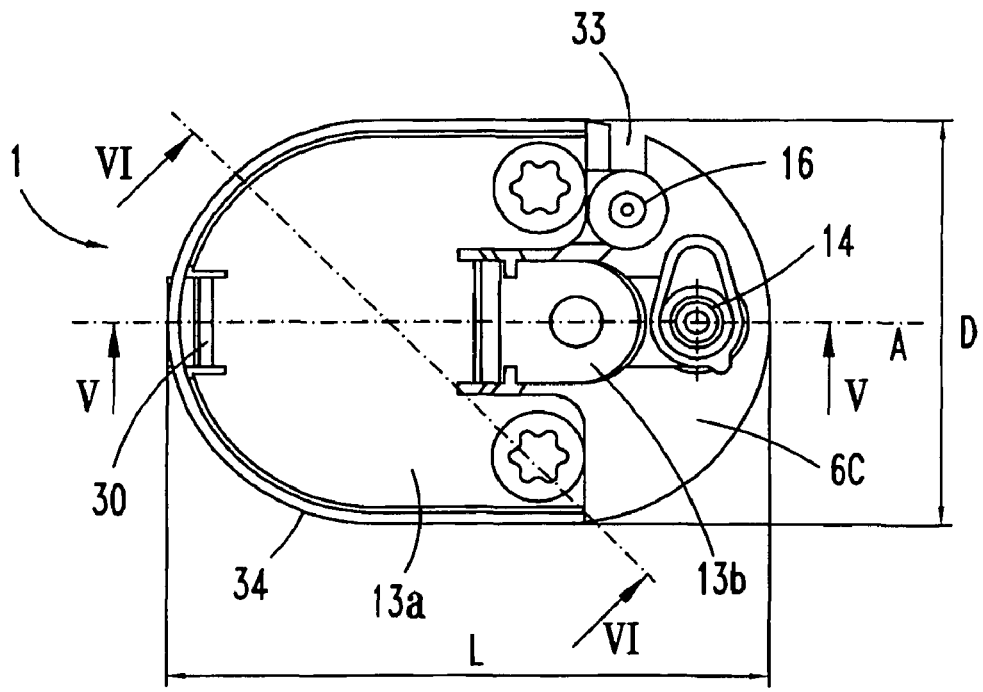
FIG. 3 is a ground view of the auxiliary electromagnetic valve of FIG. 1.
Figure 4:
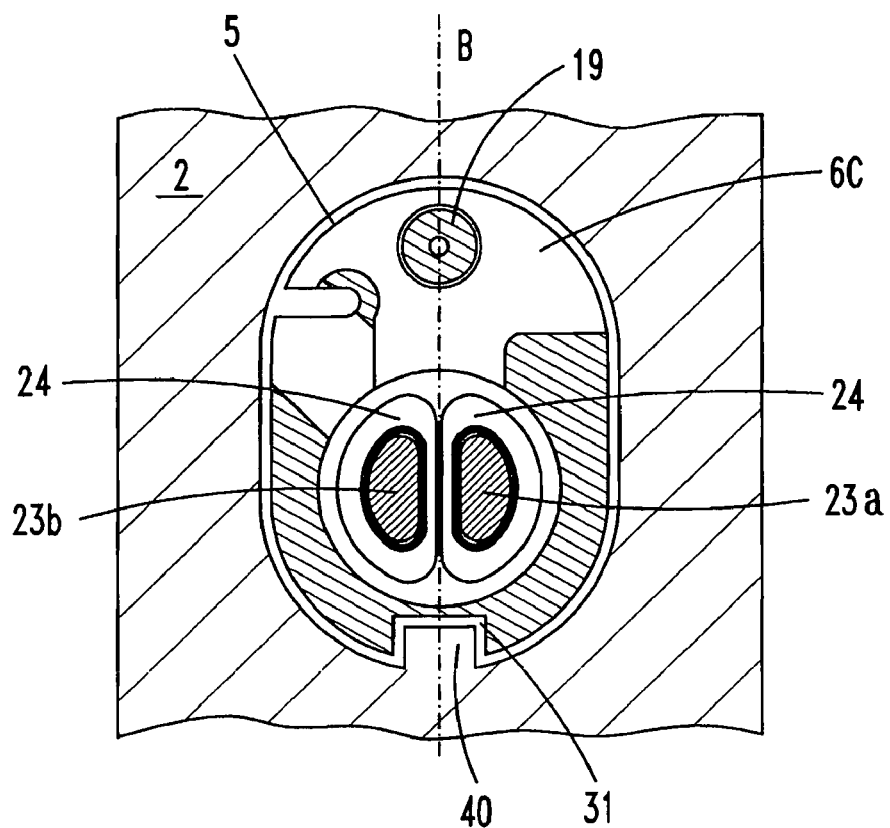
FIG. 4 is a ground view of a cross-section of the auxiliary electromagnetic valve of FIG. 1, inserted in a body of a main valve of the servo valve.
Figure 6:
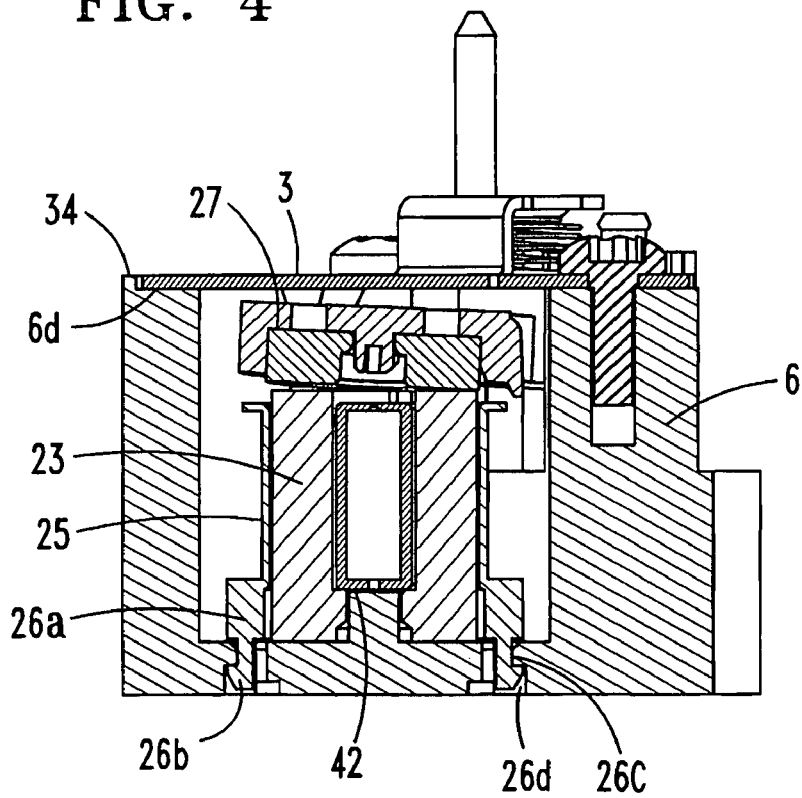
FIG. 6 is a view of the cross-section according to section VI-VI of the auxiliary electromagnetic valve of FIG. 3.

The electromagnet 11 comprises means 26a-26d for fixing and positioning it on the body 6, which are additional to the fixing of the core 23 to the base of the housing 28 of the body 6, said fixing and positioning means 26a-26d being of the fast-on type. As shown in FIG. 6, the insulating reel 25 has symmetrically aligned protuberances 26a, the bevelled heads 26b of which are inserted under compression into first grooves 26c in the base of the housing 28 of the body 6 until they reach second grooves 26d, where said heads 26b expand in order to fix the electromagnet 11 against the base of the housing 28.

By means of this fixing, the plane of symmetry B that divides the electromagnet 11, thereby separating the two branches of the core 23 from each other, coincides with the plane of symmetry of the circular-section valve seat 19, and at the same time said plane of symmetry B coincides with any plane of symmetry of the auxiliary closure member 14 and of the ferromagnetic armature 27, both of them with circular sections, thereby ensuring proper contact of the ferromagnetic armature 27 against the core 23 when the electromagnet 11 is switched on, and proper closure of the auxiliary closure member 14 against the valve seat 19 in the rest position of the auxiliary valve 1. The tilting axis, not shown in the figures, of the pivoting arm 10 coincides with a line of permanent contact of the armature 27 with the U-shaped core 23.

The pivoting arm 10 is made of moulded plastic and comprises a cavity 29 in which the ferromagnetic armature 27 is inserted fixed to said pivoting arm 10 by rapid connection means 38,39 of the type that comprise, in the cavity 29 of the pivoting arm 10, a cylindrical protuberance 38 centred towards the interior of the cavity 29, with a head 38a with a greater diameter than the diameter of the protuberance 38, which is inserted under compression through a first hole 39 of the armature 27 until it reaches a second hole 39b, with a greater diameter than the first hole 39, the head 38a thereby expanding in order to fix the ferromagnetic armature 27 to the pivoting arm 10.

When the electromagnet 11 is switched, the whole surface of the ferromagnetic armature 27 is in contact with the core 23, whereas when the auxiliary valve 1 is in the rest position, the return spring 12 pushes the closure member 14 against the valve seat 19 in order to close it.

The return spring 12 is supported against the metal support plate 13, with a substantially semi-elliptical shape, which includes a flat base 13a that is supported on the perimetral rim 6d of the body 6, and a support projection 13b of the return spring 12, substantially horizontal, projecting from one end of the base 13a and at a higher level in relation to said base 13a. The base 13a is fixed to the perimetral rim 6d by screws and, on the end opposite the projection 13b, includes a flexible flange 30 that ensures that the support projection 13b and the flexible flange 30 are centred and aligned with the major axis of the body 6. The perimetral rim 6d of the body 6 includes a perimetral edge 34 that confines the base 13a in its interior and prevents it from rotating.

The flexible flange 30 is inserted in the axial positioning channel 31 of the peripheral surface 6a and comes up against its end 32 so that the support plate 13 is firmly fixed against the body 6 thereby preventing it from shaking and preventing, due to said shaking, the projection 13b of the support plate 13 from exerting a force against the return spring 12 which has been adjusted beforehand to ensure that the closure member 14 performs a preset stroke, the purpose being to ensure that no subsequent additional adjustments are required following the assembly of the auxiliary valve 1 in the cavity 5 of the main valve 2. The support plate 13 protects the auxiliary electromagnetic valve 1 from dirt and unwanted external elements.

The positive pole of the electrical connection terminal 16 of the electromagnet 11 has the shape of a plug 16, the connecting end of which projects out of the cap 3 of the servo valve, and which may be connected either to a VDC external voltage or a printed circuit board. The negative connection terminal is a metallic ground point 15 of the auxiliary electromagnetic valve 1 connected to the metallic mass of the main valve 2 body of the servo valve. The fitting spring 22 may be used for the electrical connection of the ground point 15 of the auxiliary electromagnetic valve 1 to the cap 3, as it is shown in FIG. 7.

The electrical connection terminal 16 projects out from a coupling 18 built into the body 6, said coupling 18 being insulating and cylindrical in shape and vertically guiding the passage of the electrical plug 16 through the cap 3 of the servo valve, for the purpose of which the coupling 18 presents a deformable groove 17 in the connection with the body 6, allowing its inclination. The end of the external connection of the electrical connection terminal 16 is surrounded by an airtight bushing 21. In this embodiment the cylindrical coupling 18 has one of its bases on the intermediate transverse surface 6c and projects out in relation to the metal support plate 13, although it may also be inserted along the peripheral surface 6a, perpendicular to the intermediate transverse surface 6c, depending on the connection requirements. The peripheral surface 6a comprises an axial insertion channel 33 aligned with the coupling 18 in order to facilitate the insertion of the electrical connection terminal 16 in said coupling 18 and ensure the correct fitting of said electrical connection terminal 16 in said coupling 18, as the correct rotation of the electrical plug 16 can be checked from the exterior, once it has been inserted in the coupling 18, up to a locking position shown in FIG. 3.

In the aforementioned embodiment of the auxiliary electromagnetic valve 1, the dimensions of the valve are small, the length "L" being approximately 26 mm, the height "H" approximately 19 mm and the width "D" approximately 18 mm, with an electromagnet 11 that has a 40-ohm coil and is supplied by a nominal voltage of 0.9 VDC.

What is claimed is:

1. An auxiliary electromagnetic valve for its incorporation into a main valve of a diaphragm type gas servo valve for the supply to a domestic heating appliance, which comprises
    a body that includes an auxiliary gas outlet conduit with a valve seat, said auxiliary outlet conduit being connected to a gas outlet conduit of the servo valve,
    a pivoting arm housed in the body and which comprises an auxiliary closure member for said valve seat,
    an electromagnet housed in the body,
    a ferromagnetic armature inserted in the pivoting arm and which closes the magnetic circuit of the electromagnet when it is switched on, moving said pivoting arm and opening the valve seat,
    a return means for the return of the pivoting arm to a rest position in which the valve seat is kept closed, and
    a support plate fixed to the body that supports the return means, wherein the electromagnetic valve is built for its integration into a cavity of the main valve that is connected to a control chamber of said main valve, the body of the auxiliary valve being configured by means of a peripheral surface fitted to said cavity, a substantially flat lower surface supported against the bottom of the cavity by means of fitting means, an intermediate transverse surface on which the valve seat is fitted, a transverse perimetral rim upon which the support plate is fixed, and an auxiliary hole that connects the valve seat to the gas outlet conduit.

2. Auxiliary electromagnetic valve according to claim 1, wherein the body is substantially prismatic in shape with an elliptical cross-section.

3. Auxiliary electromagnetic valve according to claim 1, wherein the body is made of moulded plastic.

4. Auxiliary electromagnetic valve according to claim 1, wherein the fitting means is a spring supported beneath a cap that closes the cavity of the main valve.

5. Auxiliary electromagnetic valve according to claim 1, wherein the support plate comprises a substantially flat base that is supported on the perimetral rim of the body, and a support projection of the return means, substantially parallel to said base and positioned at a higher level in relation to said base.

6. Auxiliary electromagnetic valve according to claim 5, wherein the support projection is projected from one end of the base and is centred in relation to said base.

7. Auxiliary electromagnetic valve according to claim 5, wherein the support plate includes anti-shake fixing means in relation to the return means, said anti-shake fixing means being opposite to the projection and symmetrically centred in relation to the projection.

8. Auxiliary electromagnetic valve according to claim 7, wherein the anti-shake fixing means comprise a flange built into the support plate and an axial positioning channel included in the body, with the result that the flange is inserted into the positioning channel and comes up against one end of said positioning channel.

9. Auxiliary electromagnetic valve according to claim 8, wherein the positioning channel determines the orientation of the auxiliary valve during fitting as the interior of said positioning channel houses a projection built into the body of the main valve.

10. Auxiliary electromagnetic valve according to claim 8, wherein the flange is flexible.

11. Auxiliary electromagnetic valve according to claim 1, wherein the electromagnet, which comprises a U-shaped core with two branches, is positioned in the body with the result that an axial plane of symmetry that divides the electromagnet, separating the two branches from each other, is aligned with an axial plane of symmetry of the valve seat.

12. Auxiliary electromagnetic valve according to claim 11, wherein the plane of symmetry of the electromagnet coincides with an axial plane of symmetry of the ferromagnetic armature and with an axial plane of symmetry of the axial closure member.

* * * * *